United States Patent [19]

Sendecki

[11] 4,249,797
[45] Feb. 10, 1981

[54] DUAL IMAGE VIEWER WITH MIRROR ADJUSTING MEANS

[76] Inventor: Steve Sendecki, 11257 - 64th Ave., Delta, British Columbia, Canada, V4E 1C3

[21] Appl. No.: 42,334

[22] Filed: May 24, 1979

[51] Int. Cl.³ .............................................. G02B 27/14
[52] U.S. Cl. ................................................ 350/174
[58] Field of Search .................... 350/174, 159, 33; 250/330–334, 338, 342; 356/251, 253, 254, 255, 390, 394; 358/113

[56] References Cited

U.S. PATENT DOCUMENTS

| | | | |
|---|---|---|---|
| 3,076,961 | 2/1963 | Bibbero | 250/342 |
| 3,641,348 | 2/1972 | Schwarz | 250/334 |
| 3,736,985 | 5/1973 | Whitney | 250/333 |
| 3,743,844 | 7/1973 | Kraty | 250/334 |
| 3,749,494 | 7/1973 | Hodges | 350/33 |
| 3,752,982 | 8/1973 | Yanez | 250/333 |
| 3,812,357 | 5/1974 | Flogaus et al. | 250/334 |
| 4,027,159 | 5/1977 | Bishop | 250/338 |
| 4,166,953 | 9/1979 | Menke et al. | 250/333 |

FOREIGN PATENT DOCUMENTS 645619  11/1950  United Kingdom ...................... 356/394

Primary Examiner—Jon W. Henry
Attorney, Agent, or Firm—Fulwider, Patton, Rieber, Lee & Utecht

[57] ABSTRACT

A dual image viewer comprises a first enclosure having a first entrance for admitting light, a first optical path for light and a first exit for light; and a second enclosure having a second entrance for admitting light, a second optical path for light and a second exit for light, the second optical path intersecting the first optical path near the second exit. A semireflective surface is interposed along the first optical path where the second optical path intersects the first optical path, so that at least a portion of the light entering the first entrance is transmitted through the surface towards the first exit and at least a portion of the light entering the second entrance is reflected by the surface and deflected generally along the first optical path towards the first exit.

13 Claims, 3 Drawing Figures

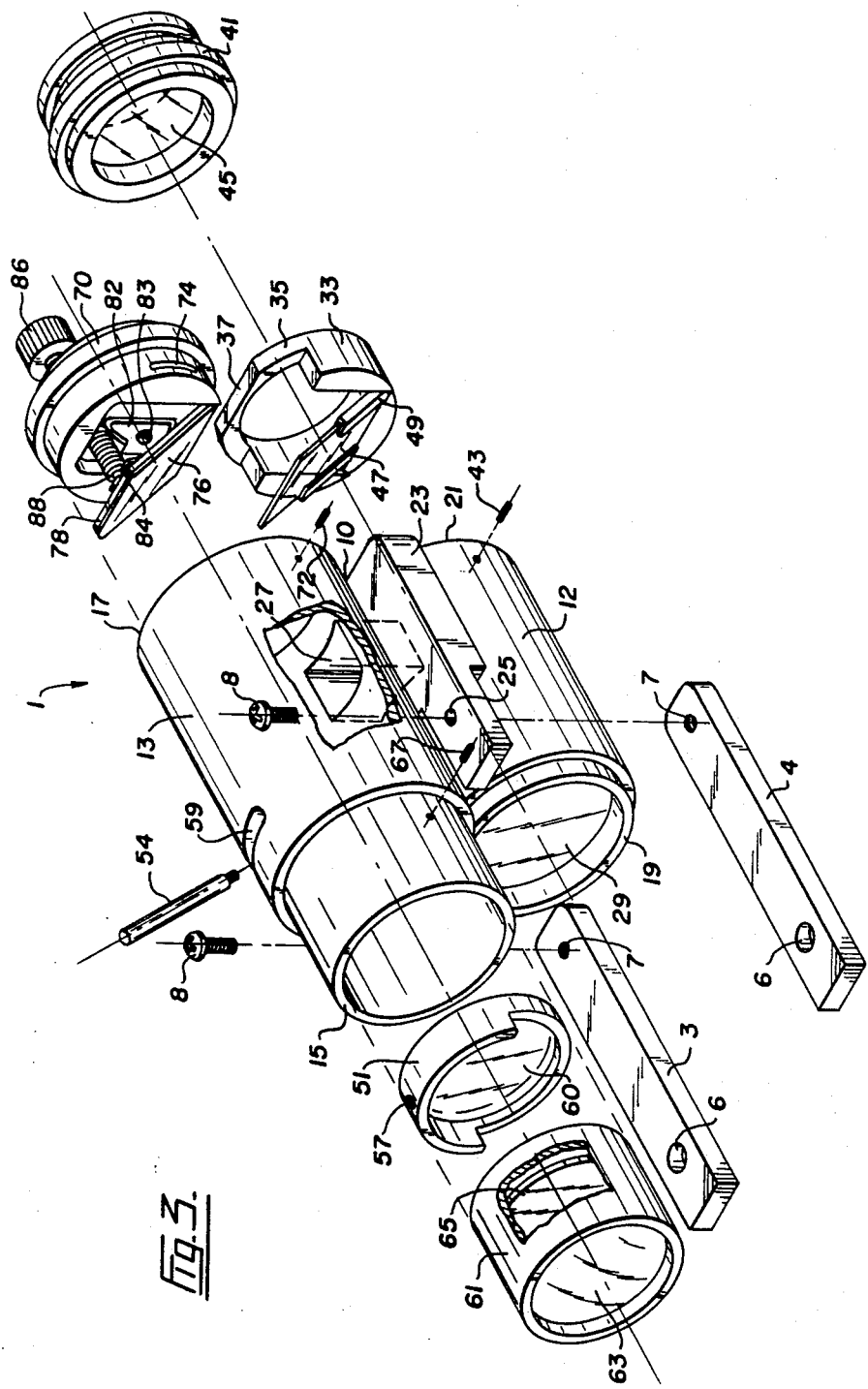

DUAL IMAGE VIEWER WITH MIRROR ADJUSTING MEANS

BACKGROUND OF THE INVENTION

This invention relates to a dual image viewer.

Infrared viewers, such as the Probeye (trade mark) infrared viewer produced by the Hughes Aircraft Company, are used for many purposes in survey work. For example, when used in an aircraft, these devices, which are sensitive to the emission of infrared radiation, can detect underground forest fires which are visually undetectable. These viewers convert the infrared image to an image within the visual spectrum. This visual image can be viewed by the eye or reproduced on photographic film if a camera is positioned on the eyepiece.

In many situations, it is desirable to compare the infrared image of a scene with the normal visual image. For example, when detecting underground forest fires, it may not be possible to locate the exact position of the fire by means of the infrared image alone. This image may not have a sufficient number of identifiable landmarks to locate the fire. However, if the normal visual image can be viewed adjacent the infrared image, or viewed coincident with the infrared image, all of the surrounding details are added and the particular stump where the fire is burning may be found. Of course, this is only one example of where it would be useful to view the visual and infrared images together and many analogous uses exist.

In the prior art, U.S. Pat. No. 3,730,985 to Whitney discloses an infrared viewer including an optical viewing system and an infrared scanning and display system disposed within a single housing. The visual image enters the unit through a red filter and the infrared image is converted to a blue image by a second viewing system. The red light of the visual image passes through a dichroic element positioned at an angle of 45° to the path of the image, while the blue light from the infrared image is deflected by the dichroic element along the path of the visual image. Consequently, the operator views a blue image superimposed on a red image.

U.S. Pat. No. 4,027,159 to Bishop describes a night vision system combining a reflected-light imaging device with an audio-monitored, far infrared detection device.

U.S. Pat. No. 3,076,961 to Bibbero shows an apparatus for co-ordinating information derived from two or more sensors, such as television and infrared devices.

Infrared viewers are disclosed in such U.S. Pat. Nos. as 3,812,357 to Flogaus, which shows a miniature infrared short range thermal imager, and 3,752,983 to Yanez which deals with an infrared attachment for a single lens reflex camera.

The prior art listed above does not disclose a simple compact dual image viewer for mounting on an infrared scanner so that a visual image, converted from an infrared image by the scanner, is produced coincident with or adjacent a normal visual image.

SUMMARY OF THE INVENTION

A dual image viewer comprises a first enclosure having a first entrance for admitting light, a first optical path for light and a first exit for light; and a second enclosure having a second entrance for admitting light, a second optical path for light and second exit for light. The second optical path intersects the first optical path near the second exit. A semireflective surface is interposed along the first optical path where the second optical path intersects the first optical path, so that at least a portion of the light entering the first entrance is transmitted through the surface towards the first exit and at least a portion of the light entering the second entrance is reflected by the surface and deflected generally along the first optical path towards the first exit. There is a mount for mounting the viewer on an infrared scanner so that a visual image converted from an infrared image by the scanner enters the first entrance and a corresponding visual image enters the second entrance, producing two coincident or adjacent images visible through the first exit.

When compared with the prior art, a dual image viewer according to the present invention offers an extremely simple and compact optical device for comparing a visual image with an infrared image. It is easily mounted on an existing infrared scanner without requiring any modifications to the scanner itself. In a preferred form of the invention, a pair of polarizing filters are used as a simple and effective means of lightening or darkening the visual image when compared with the infrared image. Also in a preferred form of the invention, a mechanism is provided for shifting the position of the visual image when compared with the infrared image so that the images coincide or can be viewed adjacent each other. In drawings which illustrate embodiments of the invention:

FIG. 3 is a exploded isometric view of the dual image viewer.

DESCRIPTION OF THE PREFERRED EMBODIMENTS

Figure 1:
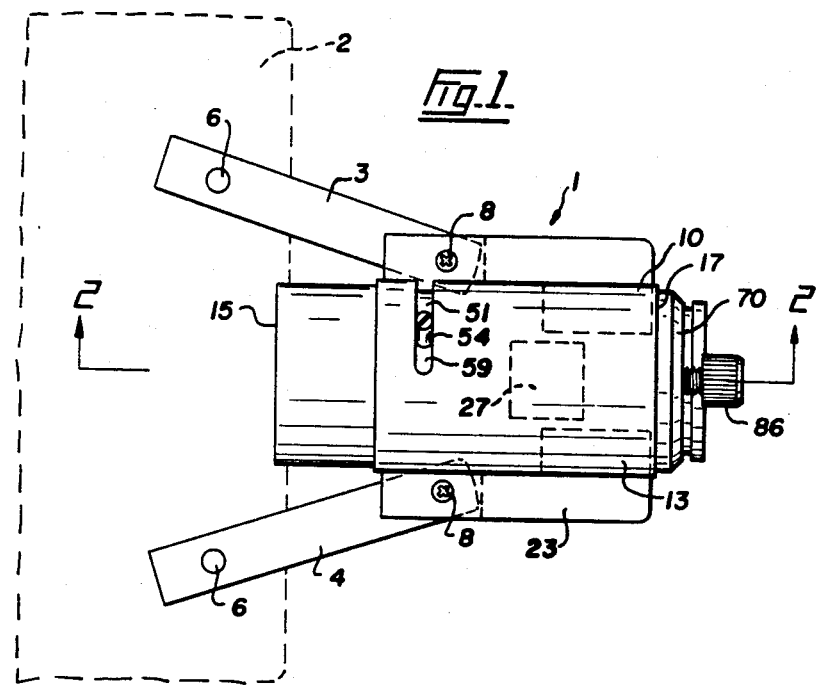
FIG. 1 is a top plan view of a dual image viewer according to an embodiment of the invention with the outline of an infrared scanner shown in broken lines.
Figure 2:
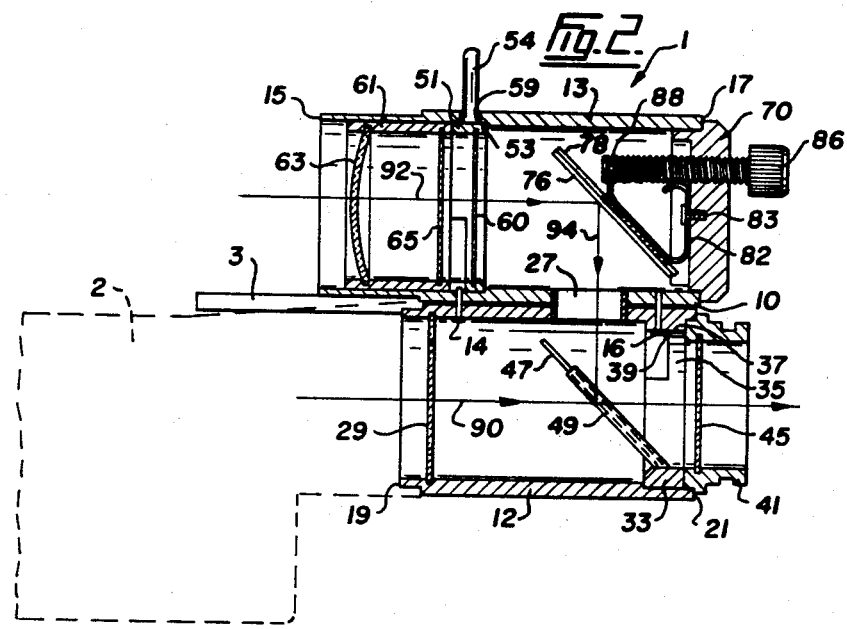
FIG. 2 is an elevational view of the dual image viewer taken along section 2—2 of FIG. 1.

The drawings shows a dual image viewer 1 adapted to be mounted on an infrared scanner 2 which is shown in broken lines in FIGS. 1 and 2. The particular dual image viewer according this embodiment of the invention is adapted for mounting on a Hughes Probeye (trade mark) infrared viewer, although this viewer, or a modified form of this viewer, could easily be mounted on other available infrared viewers. The dual image viewer 1 has a pair of identical mounts 3 and 4 for mounting the dual image viewer on the infrared viewer. The mounts 3 and 4 are elongate bars, each having an aperture 6 near one end. The mounts are connected to the infrared viewer by removing two spaced-apart screws from the infrared viewer casing which are normally used for securing an access panel to top of the unit. The screws are passed through the apertures 6 and then tightened back in their normal positions to retain the mounts 3 and 4 in the positions as shown in FIG. 1 and FIG. 2. The opposite ends of the mounts 3 and 4 are provided with apertures 7 for receiving the screws 8 used to connect the mounts to the housing 10 of the dual image viewer 1.

The housing 10 consists of a first enclosure or bottom tubing 12 and a second enclosure or top tubing 13 secured together by fasteners 14 and 16. The top tubing 13 has a front end 15 and a rear end 17 while the bottom tubing 12 has a corresponding front end 19 and rear end 21. The housing 10 also includes two forwardly extending L-shaped brackets 23 located between the top and bottom tubes 13 and 12. Brackets 23 include a pair of apertures 25 for receiving the screws 8 for the mounts 3 and 4. A rectangular aperture 27 extends vertically through the housing 10 to communicate with the inside of tubing 13 and tubing 12.

A clear glass disc 29, just within open front end 19 of the bottom tube 12, covers this end of the tube, but is optically clear to act as a first entrance for admitting light into the dual image viewer 1. A ring 33 is received within the rear end 21 of the bottom tube 12 and rests against the tube. The ring 33 has a thinner portion 35 near the top thereof with a flat top 37. The top 37 rests against a corresponding flat portion 39 of the interior of the tube 12 to provide axial alignment of the ring. Another annular ring 41 is received within the rear end 21 of the tube 12 behind the ring 33. The ring 41 is retained in position by the set screw 43 and is fitted with another glass disc 45 which acts a dust cover and as a first exit for light from the dual image viewer. A semireflective, planar surface or mirror 47 faces aperture 27 and is angled towards glass disc 45 at an angle of 45°. Mirror 47 is connected to ring 33 by a frame member 49.

A filter member 51 is rotatably received inside the front end 15 of the top tube 13 adjacent the inside shoulder 53. An elongate handle 54 is threadedly received within aperture 57 of filter member 51 and extends through the elongate slot 59 in the top tube 13. Handle 54 is used to rotate the filter member 51. The translucent disc 60 of filter member 51 is a common polarizing filter.

A lens member 61 is received within the front 15 of tube 13 and abuts the filter member 51. A convex-concave lens 63 is fitted within lens member 61 adjacent the front end 15 of tube 13 and acts as a second entrance for admitting light into the dual image viewer. The strength and purpose of lens 63 are discussed below. A second polarizing filter 65 is fitted near the opposite end of lens member 61. A set screw 67 retains lens member 61 within the tube 13.

A cylindrical plug 70 is rotatably received within the rear end 17 of top tube 13. A set screw 72 is threadedly received in the tube 13 and engages enlongate slot 74 of the plug 70. This retains plug 70 in place while permitting limited rotation.

A front silvered, planar reflective surface or second mirror 76, with a backing plte 78, is hingedly connected to the plug 70 by a V-shaped leaf spring 82 disposed between plug 70 and the backing plate 78. A fastener 83 connects spring 82 to plug 70 and clips connect the spring to mirror 76. The top of the portion of leaf spring 82 adjacent plate 78 curves away from the plate and is provided with a shallow slot 84.

A thumb screw 86 is threadedly received within a corresponding aperture in plug 70 and is provided with an unthreaded section 88 at the front thereof which has a reduced diameter and is received within the slot 84 of spring 82. Spring 82 biases frame 78 and mirror 76 towards the vertical position. Consequently, as thumb screw 86 is backed away from mirror 76 by rotating it counter-clockwise, the mirror assumes a more vertical position. However, as thumb screw 86 is rotated clockwise, it bears against the slotted portion of spring 82 to pivot mirror 76 downwardly. As seen in FIG. 2, mirror 76 is normally facing lens 63 and angled towards aperture 27 at an angle of approximately 45°. However, thumb screw 86 allows this angle to be changed slightly. The tension of spring 82 acting on screw 86 keeps the mirror 76 in the adjusted position.

In operation, infrared radiation from the subject or scene enters the infrared viewer 2 and is converted to a visible image. The front end 19 of the bottom tube 12 is positioned over the eyepiece or viewing aperture of the infrared viewer 2 so that light from the image enters the dual image viewer 1 through the first entrance or glass disc 29 near front end 19 of the tube 12. The first enclosure or bottom tube 12 defines a linear optical path 90 which is coaxial with the tube. Because the mirror 47 is semireflective, light following the first optical path 90 can pass through the mirror virtually undeflected along the first optical path to exit through the first exit at the rear end 21 of the tube 12. A certain amount of light is reflected by the mirror 47, but sufficient light passes through to form the required image.

Visible light from the same scene or subject enters the dual image viewer through the lens 63 comprising the second entrance at the front end 15 of the top tube 13. The parallax error is negligible when the subject or scene is at an appreciable distance fromt the dual image viewer. The second enclosure or top tube 13 defines a second optical path within a dual image viewer having a forward portion 92 extending between the front end 15 of the tube and the second mirror 76, coaxially with the tube 13, and parallel to the first optical path 90. The light following optical path 92 is deflected downwardly by the second mirror 76 through the rectangular aperture 27. Aperture 27 provides a second exit for light in the dual image viewer. When the mirror 76 is at angle of 45° as illustrated, the downwardly deflected light follows a second portion 94 of the second optical path which is perpendicular to the first optical path 90. The light following the second portion of the second optical path strikes the semireflective mirror 47, and at least a portion of the light is reflected by the mirror along the first optical path 90 towards the first exit of the dual image viewer at the rear end 21 of the tube 12.

Consequently, when an eye or a camera is positioned over the first exit, the visual image entering the dual image viewer through the second entrance at the front end 15 of the top tube 13 is viewed simultaneously with the visual image from the infrared viewer 2 which corresponds with the infrared image of the subject and enters the viewer through the glass disc 29. An intense amount of infrared radiation, such as produced by a fire, will produce a bright image from the infrared viewer and the visible image provides references to locate the source of the infrared radiation.

Some viewers may wish to view the images side by side or one above the other. This is possible by moving the second mirror 76. When thumb screw 86 is used to tilt the mirror downwardly at an angle slightly greater than 45°, the light following the second portion 94 of the second optical path strikes the semireflective mirror 47 at a lower position and is deflected below the first optical path 90. This allows the visible image to be seen below the infrared image. Alternatively, by unscrewing thumb screw 86, and making mirror 76 slightly more vertical than 45°, the light strikes the semireflective mirror 47 slightly higher and is deflected above the first optical path 90. This allows the visible image to be seen above the infrared image.

Horizontal movement of the visible image is achieved by rotating plug 70 slightly. This means that the light reflected by the mirror 76, and following the second portion of the second optical path 94, strikes the semireflective mirror 47 to one side or the other of the first optical path 90. This permits the two images to be viewed side by side.

The relative brightness of the two images can be varied by means of the two polarizing filters mentioned above. As is well known, the amount of light transmitted by two polarizing filters in series is dependent upon the relative positions of the axes of the two filters. Handle 54 is used to rotate the filter member 51 and filter 60 to allow the amount of light passing through the two filters to be varied to give a visual image of the required brightness when compared with the infrared image.

Anyone with reasonable skill in the art can adapt the dual image viewer 1 to fit on different types of infrared viewers or other viewers for visible or invisible rays. As well as different mounts, it is necessary to choose a suitable lense 63 so that the visual image is equivalent in size to the infrared image. Lens 63 is normally in the range between −2 to −5 dioptres.

What I claim is:

1. A dual image viewer comprising:
   a first enclosure having a first entrance for admitting light, a first optical path for light and a first exit for light;
   a second enclosure having a second entrance for admitting light, a second optical path for light and a second exit for light, the second optical path intersecting the first optical path near the second exit;
   a semireflective mirror interposed along the first optical path where the second optical path intersects the first optical path, so that at least a portion of the light entering the first entrance is transmitted through the surface towards the first exit and at least a portion of the light entering the second entrance is reflected by the surface and deflected generally along the first optical path towards the first exit;
   a second mirror within the second enclosure for reflecting the light entering the second enclosure towards the first optical path;
   the second mirror being at an angle with the second optical path, the viewer including means for changing the angle to vary the position on the semireflective mirror where light from the second optical path strikes and thereby varying the position of light from the second optical path leaving the first exit, said means for changing the angle comprising means hingedly connecting the second mirror to the second enclosure and a thumb screw threadedly received in the rear end of the second enclosure and contacting the second mirror; and
   a mount for mounting the viewer on an infrared scanner so that a visual image converted from an infrared image by the scanner enters the first entrance and a corresponding visual image enters the second entrance, producing two coincident or adjacent images visible through the first exit.

2. A viewer as claimed in claim 1, the second enclosure defining a forward portion of the second optical path between the second entrance and the second mirror and a rearward portion of the second optical path extending between the second mirror and the semireflective mirror.

3. A viewer as claimed in claim 2, the forward portion of the second optical path being generally parallel with the first optical path, the rearward portion of the second optical path being generally perpendicular to the first optical path.

4. A viewer as claimed in claim 3, the second exit comprising an aperture extending from the first enclosure to the second enclosure.

5. A viewer as claimed in claim 4, the first enclosure and the second enclosure comprising two adjacent tubes, each having corresponding front ends and rear ends.

6. A viewer as claimed in claim 5, the entrances being near the front ends of the tubes.

7. A viewer as claimed in claim 6, the first exit being near the rear end of the first enclosure.

8. A viewer as claimed in claim 7, the second mirror being near the rear of the second enclosure.

9. A viewer as claimed in claim 8, the second mirror comprising a planar reflective surface facing the second entrance and angled towards the second exit to reflect light entering the second entrance through the second exit and towards the semireflective mirror.

10. A viewer as claimed in claim 9, the semireflective mirror being planar, the semireflective surface facing the second exit and being angled towards the first 11. A viewer as claimed in claim 1, the rear end of the second enclosure comprising a rotatable member through which said thumb screw passes, the second mirror being connected to the rotatable member so rotation of the rotatable member rotates the second mirror and varies the position on the semireflective mirror where light from the second optical path strikes and thereby varies the position of light from the second optical path leaving the first exit.

12. A viewer as claimed in claim 1 comprising two polarizing filters within the second enclosure and interposed along the second optical path between the second entrance and the second mirror, one of the filters being rotatable with respect to another of the filters to vary the intensity of light transmitted through the filters.

13. A viewer as claimed in claim 1 comprising a convex lens near the front end of the second enclosure for focusing light entering the second enclosure.

* * * * *